S. W. MILLER.
PIPING SYSTEM.
APPLICATION FILED DEC. 29, 1919.
1,338,994.
Patented May 4, 1920.
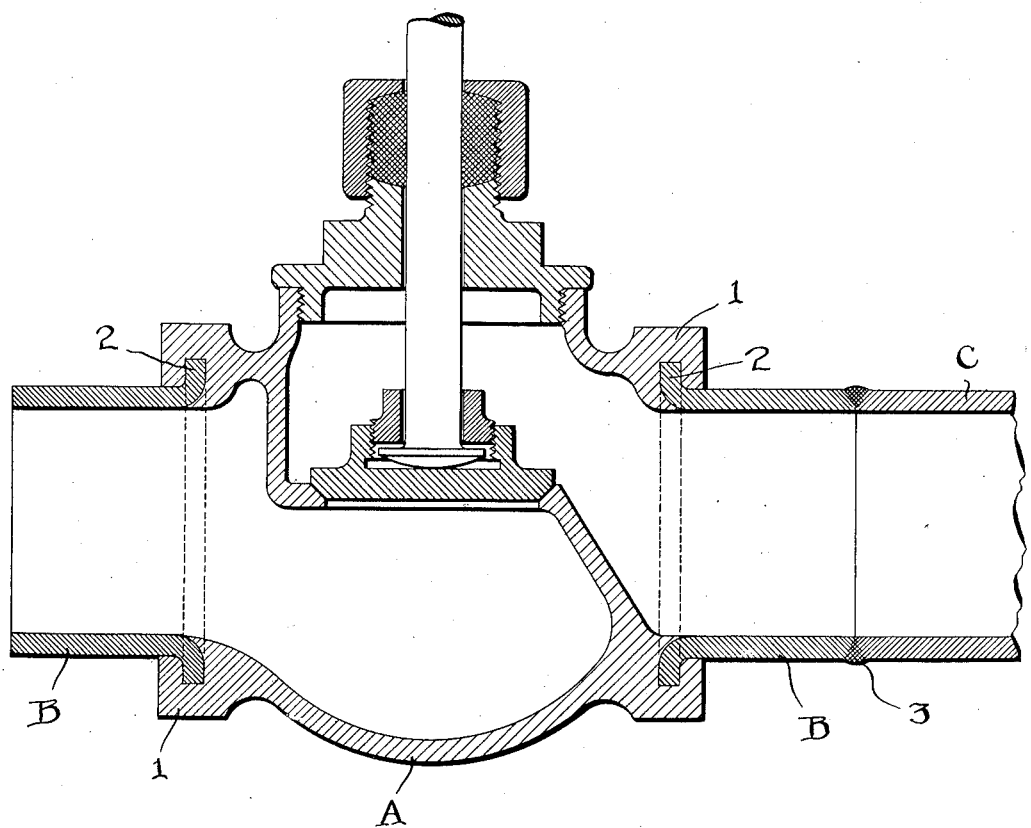

UNITED STATES PATENT OFFICE.

SAMUEL W. MILLER, OF ROCHESTER, NEW YORK.

PIPING SYSTEM.

1,338,994.  Specification of Letters Patent.  Patented May 4, 1920.

Application filed December 29, 1919. Serial No. 348,139.

*To all whom it may concern:*

Be it known that I, SAMUEL W. MILLER, a citizen of the United States, and resident of Rochester, in the county of Monroe and State of New York, have invented certain new and useful Improvements Relating to Piping Systems, of which the following is a specification.

The invention has to do with the union of pipe or other tubular members with cast bodies such as valves. Pipe lines have been welded in order to prevent leakage, but it has been unsatisfactory to weld pipes to cast iron or other metal valves and the like. The disadvantages have been, distortion or other injury to the accurately machined valve by heat, tendency to crack the valve, if of cast iron, and difficulty in making a good weld, the metals being dissimilar; for which reasons the results have been inferior to ordinary screw connections.

I find that these drawbacks can be overcome and the advantages of an integral union secured by casting into the body a projecting sleeve, especially one of steel, and welding this sleeve to the pipe or other tubular member. Under these conditions the heat will not get to the valve and the weld is successful. Such a connection cannot leak, and the pipe can be relatively light, as compared with screw-threaded pipe, which has to be sufficiently heavy throughout to take care of the weakening at the ends where the threads cut into the section. The invention can also be applied to connections with radiators, elbows, T's and other pipe fittings.

The accompanying drawing illustrating the invention shows a section through a globe valve with cast-in sleeves, one of which is fusion welded to a pipe or other tubular member.

A is the valve body of cast iron, steel, brass or other metal, having heavy ends 1. In these are cast the flanged ends 2 of relatively thin sleeves B of worked metal, preferably steel so that they can be easily welded to standard steel or wrought iron pipe. C is the pipe or tubular member, its end united to the end of the sleeve by a fusion butt-weld 3, such as made by the oxyacetylene flame.

What I claim as new is:

1. In a piping system, the combination of a cast body, a projecting sleeve cast therein, and a tubular member fusion welded to the end of said sleeve.

2. In a piping system, the combination of a cast body, a projecting ductile sleeve cast therein, and a ductile tubular member fusion welded to the end of said sleeve.

3. In a piping system, the combination of a cast body, a tubular member, a sleeve cast in the body dissimilar to the metal thereof and similar to the metal of the tubular member, and a fused union between the ends of the sleeve and tubular member.

4. A valve body having a projecting sleeve of dissimilar ductile metal cast therein for welding.

SAMUEL W. MILLER.